(12) United States Patent
Yu

(10) Patent No.: US 9,946,108 B2
(45) Date of Patent: Apr. 17, 2018

(54) DISPLAY PANEL AND MANUFACTURE METHOD THEREOF

(71) Applicant: Wuhan China Star Optoelectronics Technology Co., Ltd., Wuhan (CN)

(72) Inventor: Xiaojiang Yu, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 125 days.

(21) Appl. No.: 15/114,850

(22) PCT Filed: May 26, 2016

(86) PCT No.: PCT/CN2016/083567
§ 371 (c)(1),
(2) Date: Jul. 28, 2016

(87) PCT Pub. No.: WO2017/128577
PCT Pub. Date: Aug. 3, 2017

(65) Prior Publication Data
US 2018/0011370 A1     Jan. 11, 2018

(30) Foreign Application Priority Data

Jan. 28, 2016 (CN) .......................... 2016 1 0059557

(51) Int. Cl.
| | |
|---|---|
| *G02F 1/1343* | (2006.01) |
| *G02F 1/1335* | (2006.01) |
| *G02F 1/1368* | (2006.01) |
| *G02F 1/1333* | (2006.01) |
| *G02F 1/1341* | (2006.01) |

(52) U.S. Cl.
CPC ...... *G02F 1/133512* (2013.01); *G02F 1/1341* (2013.01); *G02F 1/1368* (2013.01); *G02F 1/13439* (2013.01); *G02F 1/133345* (2013.01); *G02F 1/133514* (2013.01); *G02F 1/134336* (2013.01); *G02F 2001/133354* (2013.01); *G02F 2001/134372* (2013.01); *G02F 2201/121* (2013.01); *G02F 2201/123* (2013.01); *G02F 2202/104* (2013.01)

(58) Field of Classification Search
CPC ................. G02F 2001/13472; G02F 1/134363
See application file for complete search history.

(56) References Cited

U.S. PATENT DOCUMENTS

2013/0057816 A1    3/2013   Hirosawa

FOREIGN PATENT DOCUMENTS

CN           101819348 A      9/2010

*Primary Examiner* — Phu Vu
(74) *Attorney, Agent, or Firm* — Leong C. Lei

(57) ABSTRACT

The present invention provides a display panel and a manufacture method thereof. By locating the matrix electrode corresponding to the black matrix on one side of the color film substrate, which is close to the liquid crystal layer, and because the matrix electrode is coupled to the common electrode signal, no voltage difference exists between the matrix electrode and the common electrode, and no matter in condition of being electrified or not electrified, the liquid crystal layer between the matrix electrode and the common electrode of the array substrate is not orientated and constantly appears in an opaque state so that no interference generates to light between adjacent pixels of the panel to eliminate the large view angle color washout of the panel and to improve the display quality of the LTPS display panel.

13 Claims, 4 Drawing Sheets

US 9,946,108 B2

DISPLAY PANEL AND MANUFACTURE METHOD THEREOF

FIELD OF THE INVENTION

The present invention relates to a display technology field, and more particularly to a display panel and a manufacture method thereof.

BACKGROUND OF THE INVENTION

With the development of display technology, the flat panel device, such as Liquid Crystal Display (LCD) possesses advantages of high image quality, power saving, thin body and wide application scope. Thus, it has been widely applied in various consumer electrical products, such as mobile phone, television, personal digital assistant, digital camera, notebook, laptop, and becomes the major display device.

Most of the liquid crystal displays on the present market are back light type liquid crystal displays, which comprise a LTPS liquid crystal display panel and a back light module. The working principle of the liquid crystal display panel is to locate liquid crystal molecules between two parallel glass substrates, and a plurality of vertical and horizontal tiny electrical wires are between the two glass substrates. The light of back light module is reflected to generate images by applying driving voltages to control whether the liquid crystal molecules to be changed directions.

Generally, the liquid crystal display panel comprises a CF (Color Filter) substrate, a TFT (Thin Film Transistor) substrate, LC (Liquid Crystal) sandwiched between the CF substrate and TFT substrate and sealant. The formation process generally comprises: a forepart Array process (thin film, photo, etching and stripping), a middle Cell process (Lamination of the TFT substrate and the CF substrate) and a post module assembly process (Attachment of the driving IC and the printed circuit board). The forepart Array process is mainly to form the TFT substrate for controlling the movement of the liquid crystal molecules; the middle Cell process is mainly to add liquid crystal between the TFT substrate and the CF substrate; the post module assembly process is mainly the driving IC attachment and the integration of the printed circuit board. Thus, the liquid crystal molecules are driven to rotate and display pictures.

Low Temperature Poly Silicon (LTPS) is a kind of liquid crystal display technology which has been widely applied in the small, medium size electronic products. The electron mobility of the traditional amorphous silicon material is about 0.5-1.0 cm$^2$/V.S but the electron mobility of the Low Temperature Poly Silicon can reach up to 30-300 cm$^2$/V.S. Therefore, the Low Temperature Poly Silicon display has many advantages of high resolution, fast response speed and high aperture ratio. At present, the LTPS (Low Temperature Poly-Silicon) display panel has been widely used in the high end mobile phone, tablet. The IPHONE 6s phone, the LG G4phone, the Kindle Fire Hdx tablet all utilizes the LTPS display panels. However, the condition of large view angle color washout happens to some LTPS display panel. As the user watches LTPS display panel from the larger angle as tilted, it can be found that the panel display deviates the normal color levels.

As shown in FIG. 1, which is a structure diagram of a LTPS display panel according to prior art, the LTPS display panel comprises a color film substrate 100 and an array substrate 200 which are oppositely positioned, and a liquid crystal layer 300 filled between the color film substrate 100 and the array substrate 200, and the color film substrate 100 comprises a first substrate 110, a black matrix 120 and a color resist layer 130 located on the first substrate 110, a flat layer 140 located on the color resist layer 130; the array substrate 200 comprises a second substrate 210, a TFT layer 220 located on the second substrate 210, a pixel electrode 230 located on the TFT layer 220, an insulation layer 240 located on the pixel electrode 230, and a common electrode 250 located on the insulation layer 240, and when the human eyes watch the display panel from the larger view angle, the light penetrating one pixel unit of the array substrate 200 will pass through two pixel units in the color film substrate 100 so that the human eyes will feel the color washout. Therefore, there is a need to provide a LTPS display panel to solve the aforesaid issue.

SUMMARY OF THE INVENTION

An objective of the present invention is to provide a LTPS display panel, in which by locating the matrix electrode corresponding to the black matrix on one side of the color film substrate, which is close to the liquid crystal layer, no interference generates to light between adjacent pixels of the panel to eliminate large view angle color washout of the panel and to improve the display quality of the LTPS display panel.

An objective of the present invention is to provide a manufacture method of a LTPS display panel, and the manufacture method is simple, and the manufactured LTPS display panel can eliminate the large view angle color washout and to improve the display quality of the LTPS display panel.

For realizing the aforesaid objectives, the present invention provides a liquid crystal display panel, comprising a color film substrate and an array substrate which are oppositely positioned, and a liquid crystal layer filled between the color film substrate and the array substrate;

wherein the color film substrate comprises a first substrate, a black matrix and a color resist layer located on the first substrate, a flat layer located on the color resist layer, and a matrix electrode located on the flat layer and located corresponding to the black matrix; the matrix electrode is coupled to a common electrode signal;

the array substrate comprises a second substrate, a TFT layer located on the second substrate, a pixel electrode located on the TFT layer, an insulation layer located on the pixel electrode, and a common electrode located on the insulation layer;

because the matrix electrode is coupled to the common electrode signal, no voltage difference exists between the matrix electrode and the common electrode, and no matter in condition of being electrified or not electrified, the liquid crystal layer between the matrix electrode and the common electrode is not orientated and constantly appears in an opaque state so that no interference generates to light between adjacent pixels of the panel to eliminate large view angle color washout of the panel.

The black matrix comprises a plurality of horizontal light shielding strips and a plurality of vertical light shielding strips, and the plurality of horizontal light shielding strips and the plurality of vertical light shielding strips are perpendicularly and crosswise aligned;

the matrix electrode comprises a plurality of horizontal strip electrodes located corresponding to the plurality of horizontal light shielding strips, and a plurality of vertical strip electrodes located corresponding to the plurality of vertical light shielding strips, and the plurality of horizontal strip electrodes and the plurality of vertical strip electrodes are perpendicularly and crosswise aligned.

Widths of the horizontal light shielding strips and the vertical light shielding strips of the black matrix are respectively larger than widths of the horizontal strip electrodes and the vertical strip electrodes of the matrix electrode.

The color resist layer comprises a plurality of first, second, third color resist blocks, which are separated apart by the black matrix; the first, the second, the third color resist blocks are alignment combinations of red, green and blue resist blocks in arbitrary orders.

Material of the flat layer is organic photoresist; material of the matrix electrode, the pixel electrode and the common electrode is Indium Tin Oxide, Aluminum Tin Oxide, Aluminum Zinc Oxide or Indium Germanium Zinc Oxide; material of the insulation layer is Silicon Oxide, Silicon Nitride or a combination of the two.

The present invention further provides a manufacture method of a LTPS display panel, comprising steps of:

step 1, providing a first substrate, and coating black light shielding material on the first substrate to form a black light shielding layer, and employing a photolithographic process to pattern the black light shielding layer to obtain a black matrix;

step 2, forming a color resist layer on the black matrix and the first substrate, and forming a flat layer on the color resist layer;

step 3, depositing transparent conductive material on the flat layer to form a transparent conductive layer, and employing a photolithographic process to pattern the transparent conductive layer to obtain a matrix electrode, which is located corresponding to the black matrix to manufacture a color film substrate;

step 4, providing an array substrate, wherein the array substrate comprises a second substrate, a TFT layer located on the second substrate, a pixel electrode located on the TFT layer, an insulation layer located on the pixel electrode, and a common electrode located on the insulation layer;

aligning the array substrate and the color film substrate to form cell, and injecting liquid crystal molecules between the array substrate and the color film substrate to form a liquid crystal layer to obtain a LTPS display panel.

The black matrix comprises a plurality of horizontal light shielding strips and a plurality of vertical light shielding strips, and the plurality of horizontal light shielding strips and the plurality of vertical light shielding strips are perpendicularly and crosswise aligned;

the matrix electrode comprises a plurality of horizontal strip electrodes located corresponding to the plurality of horizontal light shielding strips, and a plurality of vertical strip electrodes located corresponding to the plurality of vertical light shielding strips, and the plurality of horizontal strip electrodes and the plurality of vertical strip electrodes are perpendicularly and crosswise aligned.

Widths of the horizontal light shielding strips and the vertical light shielding strips of the black matrix are respectively larger than widths of the horizontal strip electrodes and the vertical strip electrodes of the matrix electrode.

The color resist layer comprises a plurality of first, second, third color resist blocks, which are separated apart by the black matrix; the first, the second, the third color resist blocks are alignment combinations of red, green and blue resist blocks in arbitrary orders.

Material of the flat layer is organic photoresist; material of the matrix electrode, the pixel electrode and the common electrode is Indium Tin Oxide, Aluminum Tin Oxide, Aluminum Zinc Oxide or Indium Germanium Zinc Oxide; material of the insulation layer is Silicon Oxide, Silicon Nitride or a combination of the two.

The present invention further provides a liquid crystal display panel, comprising a color film substrate and an array substrate which are oppositely positioned, and a liquid crystal layer filled between the color film substrate and the array substrate;

wherein the color film substrate comprises a first substrate, a black matrix and a color resist layer located on the first substrate, a flat layer located on the color resist layer, and a matrix electrode located on the flat layer and located corresponding to the black matrix; the matrix electrode is coupled to a common electrode signal;

the array substrate comprises a second substrate, a TFT layer located on the second substrate, a pixel electrode located on the TFT layer, an insulation layer located on the pixel electrode, and a common electrode located on the insulation layer;

because the matrix electrode is coupled to the common electrode signal, no voltage difference exists between the matrix electrode and the common electrode, and no matter in condition of being electrified or not electrified, the liquid crystal layer between the matrix electrode and the common electrode is not orientated and constantly appears in an opaque state so that no interference generates to light between adjacent pixels of the panel to eliminate large view angle color washout of the panel;

wherein the black matrix comprises a plurality of horizontal light shielding strips and a plurality of vertical light shielding strips, and the plurality of horizontal light shielding strips and the plurality of vertical light shielding strips are perpendicularly and crosswise aligned;

the matrix electrode comprises a plurality of horizontal strip electrodes located corresponding to the plurality of horizontal light shielding strips, and a plurality of vertical strip electrodes located corresponding to the plurality of vertical light shielding strips, and the plurality of horizontal strip electrodes and the plurality of vertical strip electrodes are perpendicularly and crosswise aligned;

wherein the color resist layer comprises a plurality of first, second, third color resist blocks, which are separated apart by the black matrix; the first, the second, the third color resist blocks are alignment combinations of red, green and blue resist blocks in arbitrary orders.

The benefits of the present invention are: the present invention provides the manufacture method of the LTPS display panel. By locating the matrix electrode corresponding to the black matrix on one side of the color film substrate, which is close to the liquid crystal layer, and because the matrix electrode is coupled to the common electrode signal, no voltage difference exists between the matrix electrode and the common electrode, and no matter in condition of being electrified or not electrified, the liquid crystal layer between the matrix electrode and the common electrode of the array substrate is not orientated and constantly appears in an opaque state so that no interference generates to light between adjacent pixels of the panel to eliminate the large view angle color washout of the panel and to improve the display quality of the LTPS display panel.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
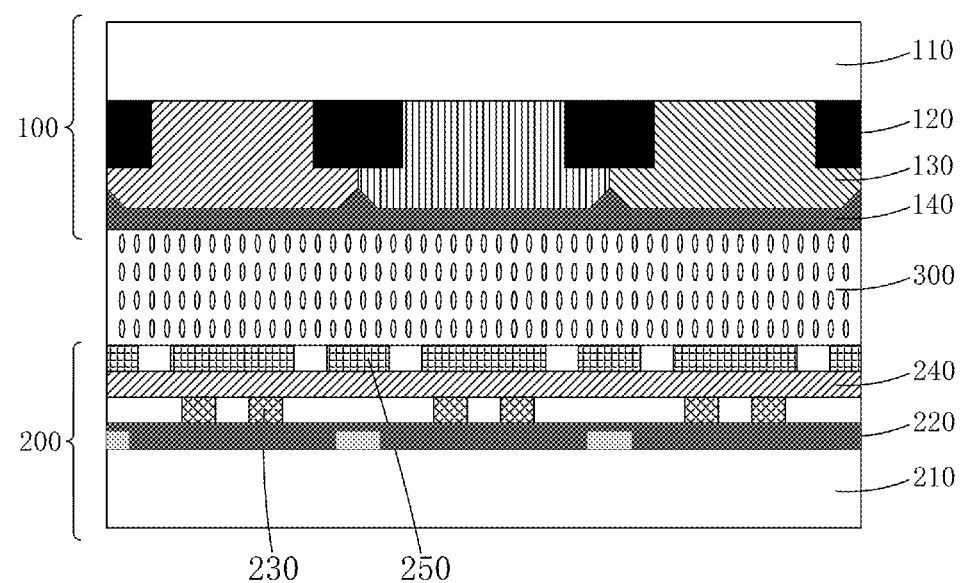
FIG. 1 is a structure diagram of a LTPS display panel according to prior art.
Figure 2:
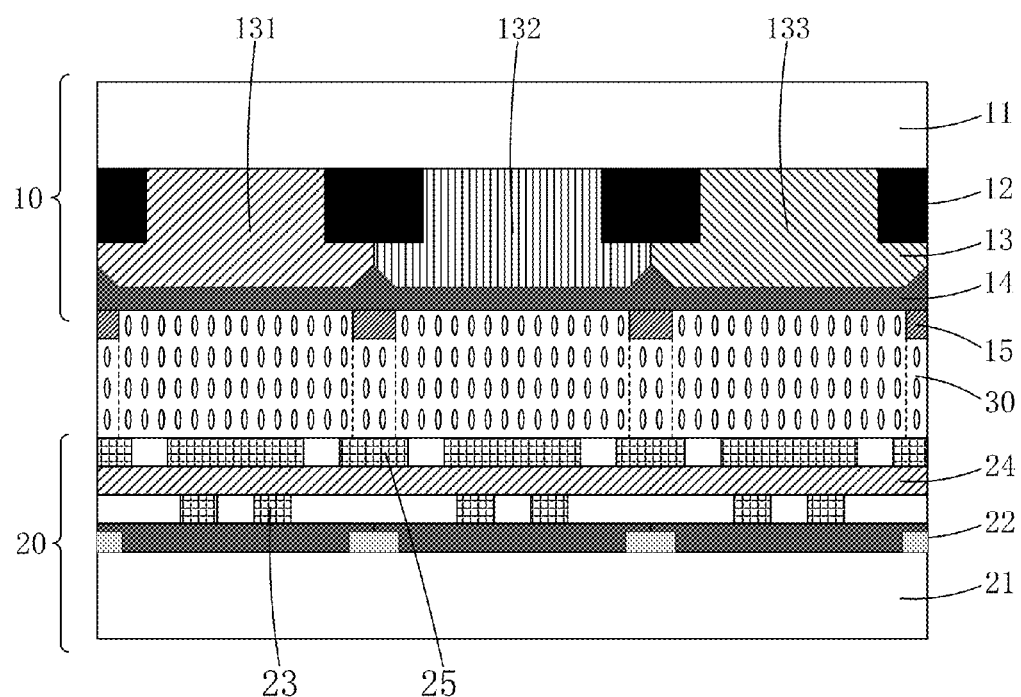
FIG. 2 is a structure diagram of a LTPS display panel according to the present invention.
Figure 3:
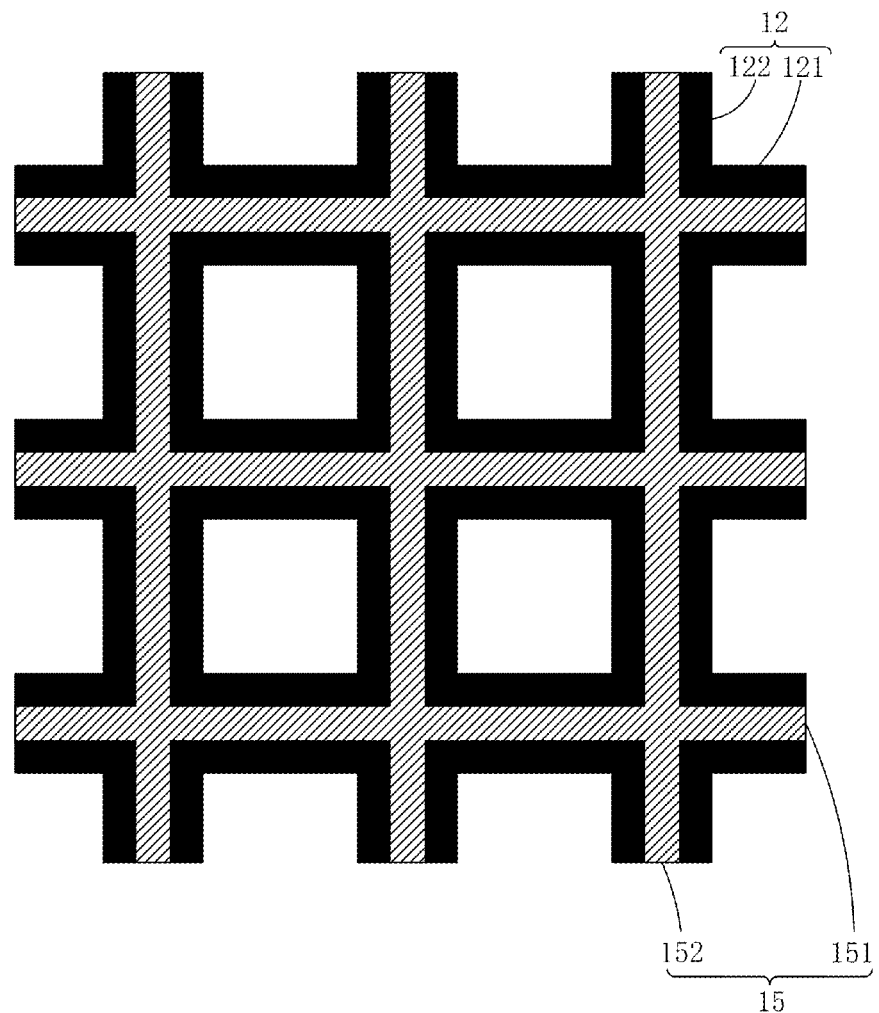
FIG. 3 is a structure diagram of a black matrix and a matrix electrode in a LTPS display panel according to the present invention and also a diagram of the step 4 in a manufacture method of a LTPS display panel according to the present invention.

Please refer to FIG. 2 and FIG. 3. The present invention provides a liquid crystal display panel, comprising a color film substrate 10 and an array substrate 20 which are oppositely positioned, and a liquid crystal layer 30 filled between the color film substrate 10 and the array substrate 20;

the color film substrate 10 comprises a first substrate 11, a black matrix 12 and a color resist layer 13 located on the first substrate 11, a flat layer 14 located on the color resist layer 13, and a matrix electrode 15 located on the flat layer 14 and located corresponding to the black matrix 12; the matrix electrode 15 is coupled to a common electrode signal;

the array substrate 20 comprises a second substrate 21, a TFT layer 22 located on the second substrate 21, a pixel electrode 23 located on the TFT layer 22, an insulation layer 24 located on the pixel electrode 23, and a common electrode 25 located on the insulation layer 24;

because the matrix electrode 15 is coupled to the common electrode signal, no voltage difference exists between the matrix electrode 15 and the common electrode 25, and no matter in condition of being electrified or not electrified, the liquid crystal layer 30 between the matrix electrode 15 and the common electrode 25 is not orientated and constantly appears in an opaque state, and thus, the light penetrating one pixel unit of the array substrate 20 only can pass through the corresponding pixel unit in the color film substrate 10 so that no interference generates to light between adjacent pixels of the panel to eliminate the large view angle color washout of the panel.

As shown in FIG. 3, the black matrix 12 comprises a plurality of horizontal light shielding strips 121 and a plurality of vertical light shielding strips 122, and the plurality of horizontal light shielding strips 121 and the plurality of vertical light shielding strips 122 are perpendicularly and crosswise aligned;

the matrix electrode 15 comprises a plurality of horizontal strip electrodes 151 located corresponding to the plurality of horizontal light shielding strips 121, and a plurality of vertical strip electrodes 152 located corresponding to the plurality of vertical light shielding strips 122, and the plurality of horizontal strip electrodes 151 and the plurality of vertical strip electrodes 152 are perpendicularly and crosswise aligned.

Specifically, widths of the horizontal light shielding strips 121 and the vertical light shielding strips 122 of the black matrix 12 are respectively larger than widths of the horizontal strip electrodes 151 and the vertical strip electrodes 152 of the matrix electrode 15.

Specifically, the first substrate 11 and the second substrate 12 are transparent substrates, and preferably are glass substrates.

Specifically, the color resist layer 13 comprises a plurality of first, second, third color resist blocks 131, 132, 133, which are separated apart by the black matrix 12; the first, the second, the third color resist blocks 131, 132, 133 are alignment combinations of red, green and blue resist blocks in arbitrary orders.

Specifically, material of the flat layer 14 is organic photoresist.

Specifically, material of the matrix electrode 15, the pixel electrode 23 and the common electrode 25 is transparent conductive material, such as Indium Tin Oxide, Aluminum Tin Oxide, Aluminum Zinc Oxide or Indium Germanium Zinc Oxide.

Material of the insulation layer 24 is Silicon Oxide ($SiO_x$), Silicon Nitride ($SiN_x$) or a combination of the two.

In the aforesaid LTPS display panel, by locating the matrix electrode 15 corresponding to the black matrix 12 on one side of the color film substrate 10, which is close to the liquid crystal layer, and because the matrix electrode 15 is coupled to the common electrode signal, no voltage difference exists between the matrix electrode 15 and the common electrode 25, and no matter in condition of being electrified or not electrified, the liquid crystal layer 30 between the matrix electrode 15 and the common electrode 25 of the array substrate 20 is not orientated and constantly appears in an opaque state so that no interference generates to light between adjacent pixels of the panel to eliminate the large view angle color washout of the panel and to improve the display quality of the LTPS display panel.

Figure 4:
FIG. 4 is a diagram of the step 1 in the manufacture method of the LTPS display panel according to the present invention.
Figure 5:
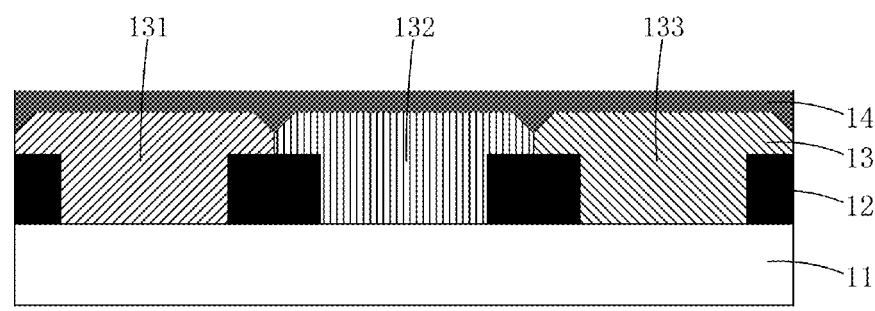
FIG. 5 is a diagram of the step 2 in the manufacture method of the LTPS display panel according to the present invention.

Please refer from FIGS. 2-6, the present invention provides a manufacture method of the aforesaid LTPS display panel, comprising steps of:

step 1, as shown in FIG. 4, providing a first substrate 11, and coating black light shielding material on the first substrate 11 to form a black light shielding layer, and employing a photolithographic process to pattern the black light shielding layer to obtain a black matrix 12.

step 2, as shown in FIG. 5, forming a color resist layer 13 on the black matrix 12 and the first substrate 11, and forming a flat layer 14 on the color resist layer 13.

Specifically, the color resist layer 13 comprises a plurality of first, second, third color resist blocks 131, 132, 133, which are separated apart by the black matrix 12; the first, the second, the third color resist blocks 131, 132, 133 are alignment combinations of red, green and blue resist blocks in arbitrary orders.

Figure 6:
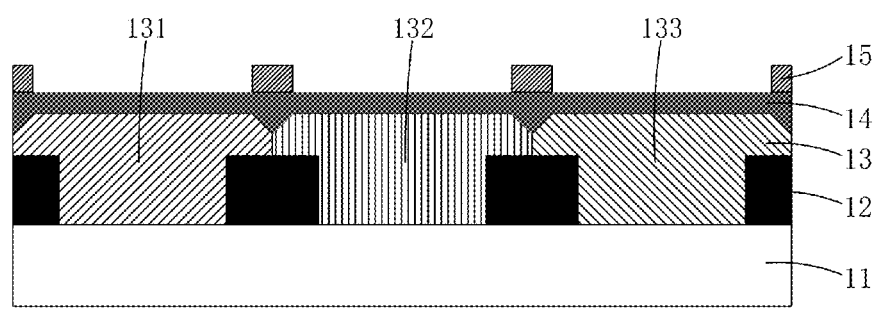
FIG. 6 is a diagram of the step 3 in the manufacture method of the LTPS display panel according to the present invention.

Specifically, material of the flat layer 14 is organic photoresist.

step 3, as shown in FIG. 6, depositing transparent conductive material on the flat layer 14 to form a transparent conductive layer, and employing a photolithographic process to pattern the transparent conductive layer to obtain a matrix electrode 15, which is located corresponding to the black matrix 12 to manufacture a color film substrate 10.

As shown in FIG. 3, the black matrix 12 comprises a plurality of horizontal light shielding strips 121 and a plurality of vertical light shielding strips 122, and the plurality of horizontal light shielding strips 121 and the plurality of vertical light shielding strips 122 are perpendicularly and crosswise aligned.

Specifically, the matrix electrode 15 comprises a plurality of horizontal strip electrodes 151 located corresponding to the plurality of horizontal light shielding strips 121, and a plurality of vertical strip electrodes 152 located corresponding to the plurality of vertical light shielding strips 122, and the plurality of horizontal strip electrodes 151 and the plurality of vertical strip electrodes 152 are perpendicularly and crosswise aligned.

Specifically, widths of the horizontal light shielding strips 121 and the vertical light shielding strips 122 of the black matrix 12 are respectively larger than widths of the horizontal strip electrodes 151 and the vertical strip electrodes 152 of the matrix electrode 15.

step 4, as shown in FIG. 2, providing an array substrate 20, wherein the array substrate 20 comprises a second substrate 21, a TFT layer 22 located on the second substrate 21, a pixel electrode 23 located on the TFT layer 22, an insulation layer 24 located on the pixel electrode 23, and a common electrode 25 located on the insulation layer 24;

aligning the array substrate 20 and the color film substrate 10 to form cell, and injecting liquid crystal molecules between the array substrate 20 and the color film substrate 10 to form a liquid crystal layer 30 to obtain a LTPS display panel.

Specifically, the first substrate 11 and the second substrate 12 are transparent substrates, and preferably are glass substrates.

Specifically, material of the matrix electrode 15, the pixel electrode 23 and the common electrode 25 is transparent conductive material, such as Indium Tin Oxide, Aluminum Tin Oxide, Aluminum Zinc Oxide or Indium Germanium Zinc Oxide.

Material of the insulation layer 24 is Silicon Oxide (SiOx), Silicon Nitride (SiNx) or a combination of the two.

In the aforesaid manufacture method of the LTPS display panel, by locating the matrix electrode 15 corresponding to the black matrix 12 on one side of the color film substrate 10, which is close to the liquid crystal layer, and because the matrix electrode 15 is coupled to the common electrode signal, no voltage difference exists between the matrix electrode 15 and the common electrode 25, and no matter in condition of being electrified or not electrified, the liquid crystal layer 30 between the matrix electrode 15 and the common electrode 25 of the array substrate 20 is not orientated and constantly appears in an opaque state so that no interference generates to light between adjacent pixels of the panel to eliminate the large view angle color washout of the panel and to improve the display quality of the LTPS display panel.

In conclusion, the present invention provides the manufacture method of the LTPS display panel. By locating the matrix electrode corresponding to the black matrix on one side of the color film substrate, which is close to the liquid crystal layer, and because the matrix electrode is coupled to the common electrode signal, no voltage difference exists between the matrix electrode and the common electrode, and no matter in condition of being electrified or not electrified, the liquid crystal layer between the matrix electrode and the common electrode of the array substrate is not orientated and constantly appears in an opaque state so that no interference generates to light between adjacent pixels of the panel to eliminate the large view angle color washout of the panel and to improve the display quality of the LTPS display panel.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display panel, comprising a color film substrate and an array substrate which are oppositely positioned, and a liquid crystal layer filled between the color film substrate and the array substrate;
    wherein the color film substrate comprises a first substrate, a black matrix and a color resist layer located on the first substrate, a flat layer located on the color resist layer, and a matrix electrode located on the flat layer and located corresponding to the black matrix; the matrix electrode is coupled to a common electrode signal;
    the array substrate comprises a second substrate, a TFT layer located on the second substrate, a pixel electrode located on the TFT layer, an insulation layer located on the pixel electrode, and a common electrode located on the insulation layer;
    because the matrix electrode is coupled to the common electrode signal, no voltage difference exists between the matrix electrode and the common electrode, and no matter in condition of being electrified or not electrified, the liquid crystal layer between the matrix electrode and the common electrode is not orientated and constantly appears in an opaque state so that no interference generates to light between adjacent pixels of the panel to eliminate large view angle color washout of the panel.

2. The display panel according to claim 1, wherein the black matrix comprises a plurality of horizontal light shielding strips and a plurality of vertical light shielding strips, and the plurality of horizontal light shielding strips and the plurality of vertical light shielding strips are perpendicularly and crosswise aligned;
    the matrix electrode comprises a plurality of horizontal strip electrodes located corresponding to the plurality of horizontal light shielding strips, and a plurality of vertical strip electrodes located corresponding to the plurality of vertical light shielding strips, and the plurality of horizontal strip electrodes and the plurality of vertical strip electrodes are perpendicularly and crosswise aligned.

3. The display panel according to claim 2, wherein widths of the horizontal light shielding strips and the vertical light shielding strips of the black matrix are respectively larger than widths of the horizontal strip electrodes and the vertical strip electrodes of the matrix electrode.

4. The display panel according to claim 1, wherein the color resist layer comprises a plurality of first, second, third color resist blocks, which are separated apart by the black matrix; the first, the second, the third color resist blocks are alignment combinations of red, green and blue resist blocks in arbitrary orders.

5. The display panel according to claim 1, wherein material of the flat layer is organic photoresist; material of the matrix electrode, the pixel electrode and the common electrode is Indium Tin Oxide, Aluminum Tin Oxide, Aluminum Zinc Oxide or Indium Germanium Zinc Oxide; material of the insulation layer is Silicon Oxide, Silicon Nitride or a combination of the two.

6. A manufacture method of a display panel, comprising steps of:
   step 1, providing a first substrate, and coating black light shielding material on the first substrate to form a black light shielding layer, and employing a photolithographic process to pattern the black light shielding layer to obtain a black matrix;
   step 2, forming a color resist layer on the black matrix and the first substrate, and forming a flat layer on the color resist layer;
   step 3, depositing transparent conductive material on the flat layer to form a transparent conductive layer, and employing a photolithographic process to pattern the transparent conductive layer to obtain a matrix electrode, which is located corresponding to the black matrix to manufacture a color film substrate;
   step 4, providing an array substrate, wherein the array substrate comprises a second substrate, a TFT layer located on the second substrate, a pixel electrode located on the TFT layer, an insulation layer located on the pixel electrode, and a common electrode located on the insulation layer;
   aligning the array substrate and the color film substrate to form cell, and injecting liquid crystal molecules between the array substrate and the color film substrate to form a liquid crystal layer to obtain a LTPS display panel.

7. The manufacture method of the display panel according to claim 6, wherein the black matrix comprises a plurality of horizontal light shielding strips and a plurality of vertical light shielding strips, and the plurality of horizontal light shielding strips and the plurality of vertical light shielding strips are perpendicularly and crosswise aligned;
   the matrix electrode comprises a plurality of horizontal strip electrodes located corresponding to the plurality of horizontal light shielding strips, and a plurality of vertical strip electrodes located corresponding to the plurality of vertical light shielding strips, and the plurality of horizontal strip electrodes and the plurality of vertical strip electrodes are perpendicularly and crosswise aligned.

8. The manufacture method of the display panel according to claim 7, wherein widths of the horizontal light shielding strips and the vertical light shielding strips of the black matrix are respectively larger than widths of the horizontal strip electrodes and the vertical strip electrodes of the matrix electrode.

9. The manufacture method of the display panel according to claim 6, wherein the color resist layer comprises a plurality of first, second, third color resist blocks, which are separated apart by the black matrix; the first, the second, the third color resist blocks are alignment combinations of red, green and blue resist blocks in arbitrary orders.

10. The manufacture method of the display panel according to claim 6, wherein material of the flat layer is organic photoresist; material of the matrix electrode, the pixel electrode and the common electrode is Indium Tin Oxide, Aluminum Tin Oxide, Aluminum Zinc Oxide or Indium Germanium Zinc Oxide; material of the insulation layer is Silicon Oxide, Silicon Nitride or a combination of the two.

11. A liquid crystal display panel, comprising a color film substrate and an array substrate which are oppositely positioned, and a liquid crystal layer filled between the color film substrate and the array substrate;
   wherein the color film substrate comprises a first substrate, a black matrix and a color resist layer located on the first substrate, a flat layer located on the color resist layer, and a matrix electrode located on the flat layer and located corresponding to the black matrix; the matrix electrode is coupled to a common electrode signal;
   the array substrate comprises a second substrate, a TFT layer located on the second substrate, a pixel electrode located on the TFT layer, an insulation layer located on the pixel electrode, and a common electrode located on the insulation layer;
   because the matrix electrode is coupled to the common electrode signal, no voltage difference exists between the matrix electrode and the common electrode, and no matter in condition of being electrified or not electrified, the liquid crystal layer between the matrix electrode and the common electrode is not orientated and constantly appears in an opaque state so that no interference generates to light between adjacent pixels of the panel to eliminate large view angle color washout of the panel;
   wherein the black matrix comprises a plurality of horizontal light shielding strips and a plurality of vertical light shielding strips, and the plurality of horizontal light shielding strips and the plurality of vertical light shielding strips are perpendicularly and crosswise aligned;
   the matrix electrode comprises a plurality of horizontal strip electrodes located corresponding to the plurality of horizontal light shielding strips, and a plurality of vertical strip electrodes located corresponding to the plurality of vertical light shielding strips, and the plurality of horizontal strip electrodes and the plurality of vertical strip electrodes are perpendicularly and crosswise aligned;
   wherein the color resist layer comprises a plurality of first, second, third color resist blocks, which are separated apart by the black matrix; the first, the second, the third color resist blocks are alignment combinations of red, green and blue resist blocks in arbitrary orders.

12. The display panel according to claim 11, wherein widths of the horizontal light shielding strips and the vertical light shielding strips of the black matrix are respectively larger than widths of the horizontal strip electrodes and the vertical strip electrodes of the matrix electrode.

13. The display panel according to claim 11, wherein material of the flat layer is organic photoresist; material of the matrix electrode, the pixel electrode and the common electrode is Indium Tin Oxide, Aluminum Tin Oxide, Aluminum Zinc Oxide or Indium Germanium Zinc Oxide; material of the insulation layer is Silicon Oxide, Silicon Nitride or a combination of the two.

* * * * *